United States Patent [19]

Ichihara et al.

[11] Patent Number: 4,954,841
[45] Date of Patent: Sep. 4, 1990

[54] OPTICAL RECORDING MEDIUM AND METHOD OF MANUFACTURING THE SAME

[75] Inventors: Katsutarou Ichihara, Tokyo; Norio Ozawa, Kawasaki; Nobuaki Yasuda, Zushi, all of Japan

[73] Assignee: Kabushiki Kaisha Toshiba, Kawasaki, Japan

[21] Appl. No.: 111,067

[22] Filed: Oct. 22, 1987

[30] Foreign Application Priority Data

| Oct. 25, 1986 | [JP] | Japan | 61-254276 |
| Nov. 10, 1986 | [JP] | Japan | 61-265456 |
| Nov. 10, 1986 | [JP] | Japan | 61-265457 |

[51] Int. Cl.$^5$ .............................................. G01D 9/00
[52] U.S. Cl. ................................ 346/135.1; 369/275.1
[58] Field of Search ............. 346/76 L, 76 PH, 135.1; 369/13, 275, 286, 288

[56] References Cited

U.S. PATENT DOCUMENTS

| 4,596,740 | 6/1986 | Tsukane | 369/13 X |
| 4,763,139 | 8/1988 | Itoh et al. | 346/76 L |
| 4,782,477 | 11/1988 | Ichihara et al. | 346/76 L |

Primary Examiner—J. R. Scott
Attorney, Agent, or Firm—Oblon, Spivak, McClelland, Maier & Neustadt

[57] ABSTRACT

An optical recording medium and methods of manufacturing the same are disclosed. The optical recording medium is provided with a transparent adhesive layer containing organic compounds such as hydrocarbon or the like that constitute resin materials, and metallic compounds whose thermal expansion coefficients are nearly equal to those of inorganic transparent materials that constitute a transparent protective layer, whereby peel-off phenomena to be caused by secular variation can be avoided.

5 Claims, 6 Drawing Sheets

OPTICAL RECORDING MEDIUM AND METHOD OF MANUFACTURING THE SAME

BACKGROUND OF THE INVENTION

1. Field of the Invention

This invention relates generally to optical recording medium capable of performing recording/reproduction of information by application of a light beam. More particularly, the invention relates to an optical recording medium having a transparent resin substrate, a transparent adhesive layer, a transparent protective layer and a recording layer, and a method of manufacturing the medium.

2. Description of the Prior Art:

An optical information-recording medium that performs recording/reproduction of information by appliCatiOn of a light beam has advantages in that a large storage capacity is available due to its extremely high density of recording. Also, non-contact recording/reproduction of information causes no wear of the medium. Thus, the its practical application of this medium to optical discs or optical cards has been considered.

Optical recording media can be classified into various kinds in terms of materials used for their recording layers. However, among these kinds, an optical recording medium of the type that can be used to record information typically has a basic structure including a recording layer on a substrate. The optical properties of the media changed when a light beam is applied to the substrate. The optical recording medium of this type is generally used by applying a laser beam through the substrate to the recording layer, and detecting the light reflected therefrom so as to reproduce information. In addition, in order to obtain high speed access this optical recording medium is generally provided with a groove on the substrate that guides an optical head.

For the reason above, such transparent resin materials as polymethyl methacrylate, polycarbonate, epoxy and polyolefin, that are superior in optical properties and groove formation readiness, are suitable as substrate materials.

On the other hand, for the recording layer materials, such materials as Te-C, TeOx, and $TeCS_2$ have already been put into practice in a DRAW (Direct Read After Write) type optical recording medium, i.e., an optical recording medium of a non-erasable type. In a second generation E-DRAW (Erasable DRAW) type, i.e., a rewritable type, optical recording medium, several media are generally known. These include a magneto-optic type recording medium in which the recording layer utilizes a rare earth-transition metal amorphous alloy thin film (hereinafter simply referred to as RE-TM film), a phase change type optical recording medium in which the recording layer is a thin film of chalcogen compound such as InSe that utilized transformation from amorphous state to crystal state, and an optical recording medium in which the recording layer is a thermo-plastic film.

However, of the recording layer materials described above, those having superior adhesive properties with respect to transparent resin materials, which are preferable as substrate materials, are limited to semi-organic group materials such as Te-C, or organic materials such as organic dye. In general, materials such as metals, semiconductors and low-grade oxides have limited adhesive properties with respect to resin materials. As a result, there have been problems in reliability. For example, such layers can readily peel off the substrate when tested with adhesive tape, or peel-off phenomena can occur after an accelerated deterioration test under high temperature with humidification.

On the other hand, an optical disc was disclosed in Laid Open Patent No. 60-7954, which corresponds to U.S. Pat. No. 4,596,740, in which an organic thin film was used as a transparent adhesive layer between a transparent resin substrate and a recording layer. According to this publication, the optical disc had a structure in which a polymer layer was sandwiched between the transparent resin substrate and the recording layer. This polymer layer had satisfactory adhesive properties with respect to the resin substrate, but could not prevent moisture from penetrating through the resin substrate. Specifically, the resin substrate and the adhesive layer of organic thin film should be matched in terms of thermal constants and mechanical constants, so that the adhesive properties therebetween are satisfactory. However, both the resin substrate and the adhesive layer of organic thin film are permeable to gaseous matter. Thus, the recording layer may be corroded by moisture penetrating through the layers. This has caused problems in reliability. Thus, when metallic group materials are used in the recording layer, such as RE-TM film which is not environment-proof, an additional transparent protective layer consisting of transparent inorganic materials should be sandwiched between the transparent adhesive layer and the recording layer. This transparent protective layer should consist of materials which are so dense as to preclude moisture permeation. Accordingly, thin films of transparent inorganic materials such as $Si_3N_4$, AlN, BN, $Al_2O_3$ and $SiO_2$ are used. However, inorganic thin films generally have properties that differ significantly from those of organic thin films in terms of thermal constants (thermal-expansion coefficients) and mechanical constants (Such as Young's modulus and Poisson ratios). Therefore, the transparent protective layer consisting of transparent inorganic material has extremely poor adhesive properties with respect to both a resin substrate and a transparent adhesive layer consisting of only organic thin film. As a result, the transparent protective layer peels off the resin substrate or peels off the transparent adhesive layer, or the transparent protective layer, itself, cracks.

As described above, in conventional optical recording medium, an Organic thin film sandwiched between a transparent resin substrate and a recording layer exhibits satisfactory adhesive properties. However, this medium has a problem in that moisture can permeate the medium.

SUMMARY OF THE INVENTION

Accordingly, one object of this invention is to provide a more reliable optical recording medium with improved resistance to peeling. Another object of the invention is to more strongly bond a substrate to a protective layer in a recording medium, and to substantially prevent moisture penetration of the medium.

Another object of this invention is to provide a method of manufacturing the above-described optical recording medium.

Briefly, in accordance with one aspect of this invention, there is provided an optical recording medium wherein there are deposited on a transparent resin substrate a transparent adhesive layer containing transparent metallic compounds and organic compOunds, a transparent protective layer consisting transparent inorganic materials, and a recording layer one after another.

The transparent adhesive layer according to this invention contains organic compounds such as hydrocarbon that are often included in resin, whereby superior adhesive properties with respect to the transparent resin substrate can be achieved. Further, the transparent adhesive layer which contains transparent metallic compounds has a thermal-expansion coefficient nearly equal to that of the combination of inorganic materials that constitute the transparent protective layer. Thus, superior adhesive properties with respect to the transparent protective layer can also be achieved.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
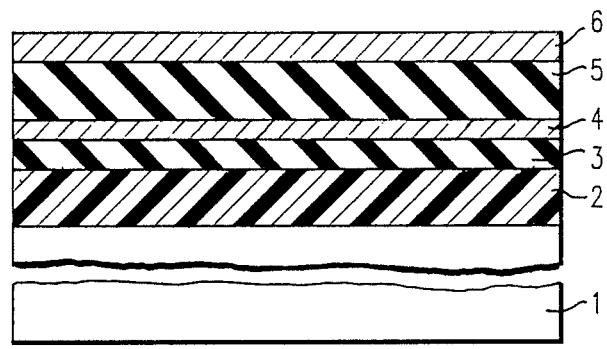
FIG. 1 is a cross-sectional diagram illustrating an optical disc according to the one embodiment of the present invention.

In accordance with the present invention, there is provided an optical recording medium wherein thin film layers are deposited one after another on a transparent resin substrate. These layers include a transparent adhesive layer that contains transparent metallic compounds and organic compounds, and a transparent protective layer containing transparent inOrganic materials.

The transparent metallic compounds included in the transparent adhesive layer preferably include at least one of the following metallic compounds: In, Te, Al, Si, Ti, Cr, Ge, Sn, B, Mg, Ca, Zn, and Bi. In particular, assuming that the transparent metallic compound is Me-X, X being an oxide, In, Te, Al, Ti, Cr, Ge and Sn preferably are used as the metallic element Me. When X is a nitride, Al, Si, Ge and B preferably are used as the metallic compound Me. When X is a metallic fluoride, Mg and Ca preferably are used as the metallic compound Me. When X is a sulfide, Zn is preferred for the metallic compound Me. In addition to these transparent metallic compounds, hydrocarbon (paraffin, olefin, etc.), and organic compounds such as carbonized fluorine, are present in the transparent adhesive layer. Here, the transparent metallic compounds contained in the transparent adhesive layer may be of a single kind. However, it is more desirable that transparent metallic compounds of two or more kinds be contained in the transparent adhesive layer to further enhance adhesive properties.

When the transparent adhesive layer contains one kind of transparent metallic compounds such as oxide, nitride or carbide, the film structure of the layer is relatively simple. However, with two or more kinds, the film structure becomes reticulated and the cohesive strength thereof increases significantly.

The film thickness of the transparent adhesive layer should be in an appropriate range of about 500 to about 2000Å, and more preferably, in a range of about 700 to about 1500Å.

According to the present invention, in order to form a transparent adhesive layer containing transparent metallic compounds and organic compounds on a transparent resin substrate, two deposition methods, reactive sputtering and activated evaporation, may be used. Reactive sputtering is performed by the use of metallic targets within a mixed gas, including a gas or gases of at least one kind that reacts with the metallic targets, and organic compound gases. The activated evaporation is performed by the use of metallic evaporation sources within a mixed gas, including a gas or gases of at least one kind that reacts with the metallic sputtering sources, and organic compound gases. Such layers as a transparent protective layer, consisting of transparent inorganic materials, and a recording layer are deposited on the transparent adhesive layer.

Referring now to the drawings, wherein like reference numerals designate identical or corresponding parts throughout the several views, and more particularly to FIG. 1 thereof, one embodiment of the present invention will be described.

FIG. 1 is a cross-sectional diagram illustrating a configuration of an optical recording medium according to the present invention. In FIG. 1, on a disc-shaped transparent resin substrate 1, there are deposited thin film layers one after another such as a transparent adhesive layer 2, a first transparent protective layer 3, a recording layer 4, a second transparent protective layer 5 and a light reflecting layer 6. The transparent resin substrate 1 consists of transparent resin materials such as polymethyl methacrylate, polycarbonate and epoxy, and has a previously-formed guide groove (not shown) that guides an optical head for use in performing recording-/reproduction of information.

The transparent adhesive layer 2 is not a conventional simple organic thin film, but contains metallic compounds and hydrocarbon (preferably, chain hydrocarbon) of paraffin groups which are organic compounds, for example. The forming process for the transparent adhesive layer 2 differs from the conventional forming process such as spin coating. The adhesive layer 2 is formed by reactive sputtering of metal targets within a mixed gas, including gases that react with the metal targets such as oxygen, nitrogen and hydrogen sulfide, and organic compound gases such as methane and ethylene.

The first transparent protective layer 3 protects the recording layer 4 against moisture penetration through the transparent resin substrate 1, and is formed of a thin film of transparent inorganic materials, such as $Si_3N_4$, $SiO_2$, $SiO$, $AlN$ and $ZnS$.

The recording layer 4 may be formed from any material that can perform recording/reproduction of information by application of a laser beam. However, in the present invention, a metallic thin film such as an RE-TM film, which is inferior by itself in corrosion resistance, is used. The combination of layers according to the present invention is significantly more effective in resisting corrosion.

The second transparent protective layer 5 is formed by a thin film of transparent inorganic materials in the same manner as the first transparent protective layer. In this embodiment, the light reflecting layer 6 also serves as a protective layer, so that the second transparent protective layer 5 is not necessarily required. However, when the recording layer 4 is of a film that performs reproduction by utilizing photomagnetic Kerr effects as in the RE-TM film, the second transparent protective layer 5 serves, in effect, as an interference layer to enlarge the Kerr rotation angle.

The light reflecting layer 6 functions to reflect incident light from side of the transparent resin substrate 1, and is formed from such thin films as Al, Ti, Cr, Au and Ag.

Figure 2:
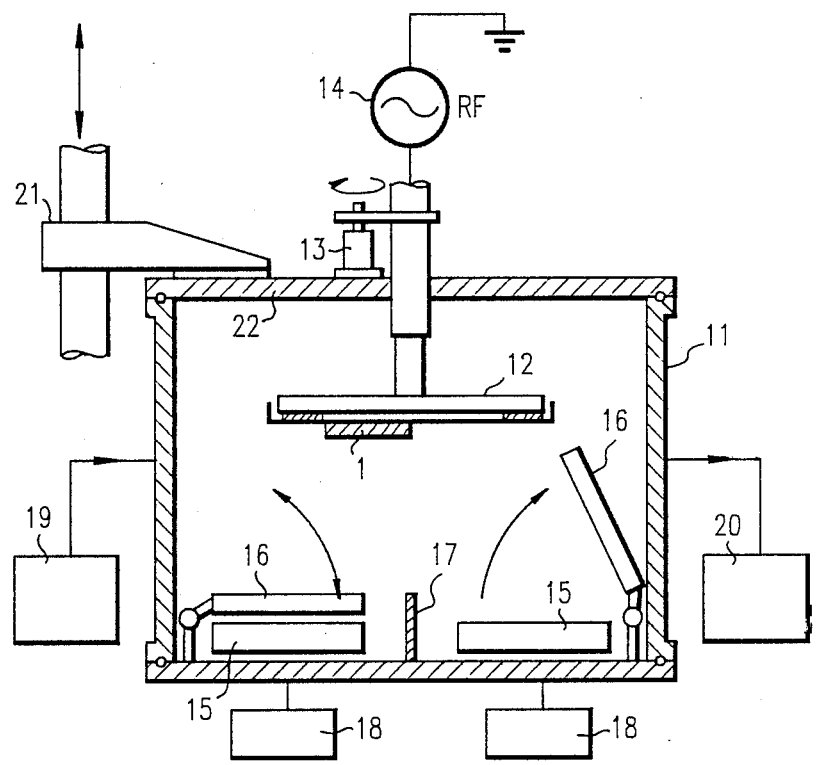
FIG. 2 is a schematic diagram illustrating a sputtering apparatus for use in manufacturing the optical disc according to the present invention.

FIG. 2 illustrates schematically a configuration of a sputtering apparatus for use in manufacturing the optical recording medium according to the present invention. Within a sputtering chamber 11, a rotatable substrate holder 12 is provided, and on the under surface thereof, the transparent resin substrate 1 is supported. The substrate holder 12 is connected to an electric motor 13 and an RF power source 14, both disposed outside the sputtering chamber 11.

Four sputtering sources 15 are disposed on the base of the sputtering chamber 11 (here, only two of them are shown for the simplicity). Four shutters 16 are respectively disposed over the four sputtering sources 15, and shield members 17 are disposed between the sputtering sources 15. The sputtering sources 15 are respectively connected to sputtering power sources 18 disposed outside the sputtering chamber 11. RF power sources and DC power sources are selectively utilized as the sputtering power sources 18. To the sputtering chamber 11, are connected a gas supply system 19 and an exhaust system 20. A top plate 22 of the sputtering chamber 11 is coupled to an elevator mechanism 21.

(Embodiment 1)

The optical disc of the configuration shown in FIG. 1 was manufactured by the following procedures using the sputtering apparatus shown in FIG. 2. As the transparent resin substrate 1, a polycarbonate substrate of 120 mm in diameter and 1.2 mm thick with a guide groove was prepared. This polycarbonate substrate was obtained by injection-molding a polycarbonate resin by the use of a stamper. The stamper was manufactured from a master disc derived from a photo-polymer layer. The photo-polymer layer was disposed on a glass substrate after being exposed to an Ar ion laser and being developed. This polycarbonate substrate was cleaned by 5-minute ultrasonic cleaning within an neutral detergent solution, and washed with pure water. Thereafter, the substrate was dried by nitrogen-blowing and desiccation. Then, it was introduced into the sputtering chamber 11, and secured by screws to the substrate holder 12. The elevator 21 was lowered so that the sputtering chamber 11 became sealed. The exhaust system 20 was operated so as to exhaust the pressure within the sputtering chamber 11 down to a pressure of $5 \times 10^{-6}$ Torr. Then the gas supply system 19 provided Ar gas of 99.999% purity so that the gas pressure within the sputtering chamber 11 was maintained at a pressure of $5 \times 10^{-3}$ Torr. Next, the substrate holder 12 was rotated by the electric motor 13 at a speed of 60 r.p.m. With one of the shutters 16 closed, one of the power sources 18 supplied a DC current of 0.5Å to the sputtering source 15 under the closed shutters 16. This sputtering source contained an In target of 5 inches in diameter. This pre-sputtering (sputtering with the shutter 16 closed) was performed for 10 minutes, so that the surface of the In target was cleaned. Then the power source 18 was turned off, and the supply of Ar gas from the gas supply system 19 was stopped. Thereafter, the pressure within the sputtering chamber 11 was again exhausted by the exhaust system 20 down to a pressure of $5 \times 10^{-6}$ Torr. Then the gas supply system 19 supplied a mixed gas $CH_4$, $O_2$ and $N_2$ as a sputtering gas, so that the gas pressure within the sputtering chamber 11 was maintained at a pressure of $5 \times 10^{-3}$ Torr.

The gas-mixing ratio of this mixed gas for sputtering was $CH_4/O_2 = 50/50$ and $N_2/(CH_4+O_2+N_2) = 30/100$ in volume ratio. In this state, the shutter 16 disposed over the sputtering source 15 containing the In target was opened, and a RF current of 0.8A was applied to this sputtering source 15. Then magnetron sputtering was performed for a period of 10 minutes. This magnetron sputtering formed a film as the transparent adhesive layer 2, in which $In_2O_3$. InN and organic compounds were mixed (hereinafter, this film is referred to as ICON film). In this case, the total flow quantity of the mixed gas for sputtering was 60 SCCM (Standard Cubic Centimeter/Minute) at a maximum, and the electric discharge time was controlled to cause the film thickness of ICON film to be about 1000Å. Thereafter, the pressure within the sputtering chamber 11 was returned to atmospheric pressure, and the elevator 21 was raised so that The substrate 1 with the ICON film transparent adhesive layer 2 could be taken out.

Moreover, on the substrate holder 12, such small substrate pieces as polymethyl methacrylate, polycarbonate, epoxy and glass (15 mm $\times$ 25 mm in size) are supported together with the polycarbonate substrate, and on the respective small substrate pieces, transparent ICON films are formed in the same manner as described above.

Figure 3A:
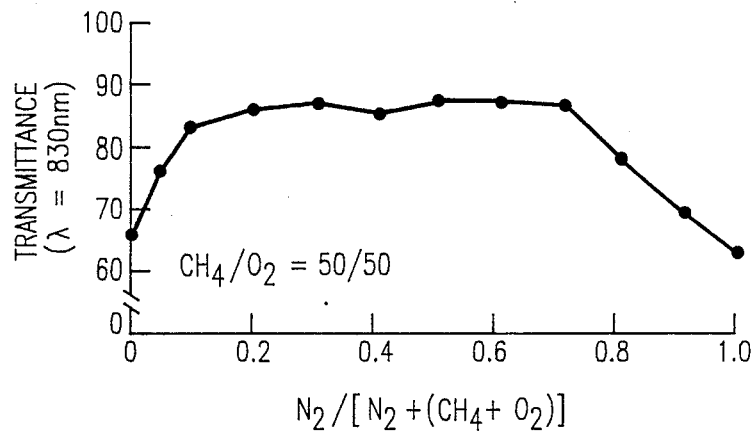
FIGS. 3(a)-3(b), 4(a)-4(c) and 5(a)-5(c) are graphs illustrating the results of evaluations of the relationship between the compositions of mixed gases used in sputtering in accordance with the method of manufacturing the optical disc according to the present invention and the transmittances of transparent adhesive layers.

FIG. 3(a) illustrates the results of measurements of ICON films in terms of transmittance at a wavelength of 830 nm when the ICON films are formed on a substrate of polymethyl methacrylate with various modifications of compositions of mixed gases for Sputtering (Measurements were made with the measuring instrument "Cary-17" manufactured by Varian corp.). These illustrations show practically sufficient values such that when the compositions of the mixed gases for sputtering were in the range of $CH_4/O_2 = 50/50$ and $N_2/(CH_4+O_2+N_2) = 0.2$ to 0.8, transmittances were greater than or equal to 85%.

In addition, the ICON films formed on the small substrate pieces of the above-described four kinds were evaluated in terms of adhesive properties with respect to the substrates by the use of adhesive tapes. However, none of the ICON films showed peel-off phenomena. Further, even after four cycles of the Accelerated deterioration tests under such environments that change cyclically between 24-hour high-temperature/high-humidity of 65 C/90% R. H. (Relative Humidity) and 1-hour room temperatures, none of the small substrate pieces of the above-described four kinds showed "peel-off" of the ICON films, and there was no change in their film qualities and transmittances.

Next, within the four sputtering sources 15 of FIG. 2, the respective targets such as Si, Tb, Co and Al, were disposed. Then such film layers were formed by the following procedures as first transparent protective layer 3 consisting of $Si_3N_4$ film, the recording layer 4 consisting TbCo film, the second transparent protective layer 5 (interference layer) consisting of $Si_3N_4$ film, and the light reflecting layer 6 consisting of Al film.

First, the polycarbonate substrate, on which the ICON film transparent adhesive layer 2 was formed, was secured by a screw to the substrate holder 12 together with a polycarbonate substrate without the transparent adhesive layer 2, for the sake of comparison. The elevator 21 was then lowered and the pressure within the sputtering chamber 11 was exhausted by the exhaust system 20 down to a pressure of $5 \times 10^{-6}$ Torr. Thereafter, a mixed gas of $N_2$-Ar with 3% partial pressure of $N_2$ was introduced into the sputtering chamber 11, and the gas pressure therein was maintained at a pressure of $5 \times 10^{-3}$ Torr. Next one of the power sources 18 supplied RF power of 300 W to one of the sputtering sources 15 in which an Si target was disposed and one of the shutters 16 corresponding thereto was closed. Then the pre-sputtering was performed for 5 minutes so that the target surface was cleaned. Thereafter, the closed one of shutters 16 was opened, and the reactive sputtering was performed for 20 minutes so that on both the polycarbonate substrates 1 with and without the transparent adhesive layer 2, were formed $Si_3N_4$ films of approximately 1000Å thick as the first transparent protective layer 3.

Next, the pressure within the sputtering chamber 11 was again exhausted by the exhaust system 20 down to a pressure of $5 \times 10^{-6}$ Torr, and Ar gas of 99.999% in purity was introduced by the gas supply system 19 into the sputtering chamber 11. The gas pressure therein was maintained at a pressure of $5 \times 10^{-3}$ Torr. The RF power source 14 was then turned on to supply RF power of 300 W, so as to perform 5-minute sputter etching process, so that the surface of the $Si_3N_4$ was cleaned.

Next, with two of the shutters 16 corresponding to two of the sputtering sources 15 of a Tb target and a Co target closed, the power sources 18 supplied DC power to the sputtering sources 15 of both the targets so as to cause electric discharge currents of 0.5 A and 1.5 A to respectively flow into the Tb target and the Co target. Thus 5-minute pre-sputtering was performed and the respective target surfaces were cleaned. Thereafter, the substrate holder 12 was rotated by the electric motor 13 at a speed of 60 r.p.m. and then the two of shutters 17 corresponding to the sputtering sources 15 of the Tb target and the Co target were simultaneously opened for a period of 35 seconds so as to form a TbCo film. The recording layer 4 consisting of the TbCo film of approximately 250 Å thick was formed, and then the power source 16 for sputtering was turned off.

Next, the mixed gas for sputtering within the sputtering chamber II was exchanged for $N_2$-Ar mixed gas containing $N_2$ of 3% partial pressure, and one of the power sources 18 supplied RF power of 300 W to one of the sputtering sources 15 of the Si target. Then the pre-sputtering was performed for 5 minutes. Thereafter the sputtering film formation was performed for 5 minutes, so that the second transparent protective layer 5, consisting of the $Si_3N_4$ film of approximately 250 Å thick, was formed on the recording layer 4.

Next, the gas within the sputtering chamber 11 was exchanged for the pure Ar gas, and RF power of 300 W from one of the power sources 18 was supplied to one of sputtering sources 15 of the Al target. After a 5-minute pre-sputtering, the sputtering film formation was performed for a period of 10 minutes, so that the light reflection layer 6, consisting of the Al film of approximately 1000 Å thick, was formed On the second transparent protective layer 5, consisting of the $Si_3N_4$ film. Thereafter, the power source 18 for sputtering was turned off, while at the same time the rotation of the substrate 1 was ceased. Then the pressure within the sputtering chamber 11 was returned to atmospheric, and the substrate 1 was raised by the elevator 21. Then the optical disc shown in FIG. 1 was taken out.

On the other hand, as the samples for comparison, the small substrate pieces of glass, polymethyl methacrylate, polycarbonate and epoxy were secured together with the polycarbonate substrate 1 to the substrate holder 12. On the respective small substrate pieces, thin film layers such as the transparent adhesive layer 2 consisting of the transparent ICON film, the first transparent protective layer 3, the recording layer 4, the second transparent protective layer 5 and the light reflecting layer 6 were formed. There were also manufactured samples of all the same as described above, except that the transparent adhesive layer 2 was not present. These samples with and wIthout the transparent adhesive layer 2 were evaluated in terms of characteristics immediately after the film formation. First, a laser beam from a He-Ne laser apparatus was applied from the back side of the substrate, and a reflectance R and a Kerr rotation angle $\theta_k$ were measured. The results of measurement were such that in the case of the sample of polymethyl methacrylate substrate on which the transparent adhesive layer 2 of the ICON film was formed, R = 25% and $\theta_k = 0.45$ deg. This confirmed that a practically sufficient figure of merit ($R \times \Lambda_k$, the product of the two) was obtained.

The results of peel-off test by the use of adhesive tapes were as follows. In the case of the samples of polymethyl methacrylate, polycarbonate and epoxy with the transparent adhesive layer 2 consisting of the transparent ICON film formed by the use of the mixed gases for sputtering of such compositions that C=50/50 and $N_2/(CH_4+O_2+N_2)=0.2$ to 0.8, none of the samples showed peel-off phenomena. In contrast to this, in the case of the samples without the transparent adhesive layer 2, and also in the case of the samples with the transparent adhesive layer consisting of the transparent ICON film formed by the use of the mixed gases for sputtering of such compositions except that $CH_4/O_2=50/50$ and $N_2/(CH_4+O_2+N_2)=0.2$ to 0.8, all of the samples showed peel-off phenomena, and all the respective layers such as the layer 2 through the layer 6 peeled off.

Furthermore, these samples and the optical disc using the polycarbonate substrate 1 of 120 mm in diameter with the guide groove were put through the accelerated deterioration test under a high-temperature/high-humidity environment of 65° C./90% R.H. for 24 hours, room temperature for one hour, and a high-temperature/high-humidity of 65° C./90% R. H. for 48 hours. Thereafter, they were examined as to whether or not there existed any peel-off. In the case of the samples with the transparent adhesive layer 2 consisting of the transparent ICON film formed by the use of the mixed gases for sputtering of such compositions that $CH_4/O_2 = 50/50$ and $N_2/(CH_4+O_2+N_2)=0.2$ to 0.8, there was no peel-off as to the respective layers such as the layer 2 through the layer 6. To the contrary, in the case of conventional optical disc without an adhesive layer, after the accelerated deterioration test, its first transparent protective layer and the respective layers thereon all peeled off.

The reason why the transparent adhesive layer 2 enhances the peel-off resistance is essentially that the ICON film includes organic compounds such as hydrocarbon, which are prime constituents of the transparent resin substrate 1, and transparent metallic compounds, such as $In_2O_3$ and $InN$ which are in the same group with transparent inorganic materials that constitute the transparent adhesive layer 2, and possesses the intermediate properties between the two.

Moreover, according to the experiments made by the inventors of the present invention, the transparent adhesive layer 2 consisting of the ICON film possesses higher peel-off resistance than ICO film (a mixture film derived from combination of $In_2O_3$ and C-H) which includes a transparent metallic compound of a single kind such as $In_2O_3$.

The reason for this is that unlike the ICO film, the ICON film is structured so that In-0 and In-N are combined in a reticulate fashion, and C-H combinations are exhibits higher peel-off resistance with respect to the transparent resin substrate 1 and also to the transparent protective layer 3. The reason can be also that the compounds are not limited to In compounds, but when transparent metallic compounds of at least two kinds are used together with organic materials for the transparent adhesive layer 2, the combination state within the transparent adhesive layer 2 becomes a three-dimensional reticulation. Thus, the peel-off resistance becomes enhanced as compared to the case when a metallic compound of a single kind is used. When using metallic compounds of at least two kinds, they may be either metallic element compounds of the same kinds such as ICON film, or those of different kinds.

(Embodiment 2)

An optical disc was manufactured comprising an ICON film adhesive layer formed in the same manner as in embodiment 1 except that compositions of the mixed gases were varied The compositions of mixed gases were determined such that $CH_4/O_2=25/75$ was held constant, and $N_2/(CH_4+O_2+N_2)$ was varied between 100/0 to 0/1OO. The total gas flow quantity of the entire sputtering was adjusted to 60 SCCM at a maximum, and the electric discharge times were so arranged as to obtain the films of ICON film all the same as 1000 Å in thickness.

Figure 3B:
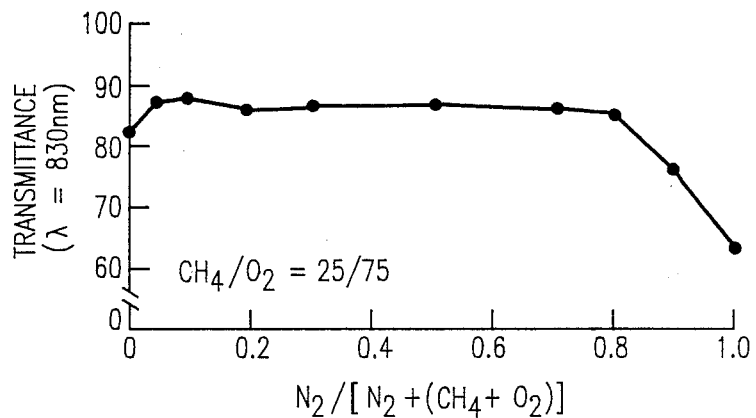
Figure 3C:
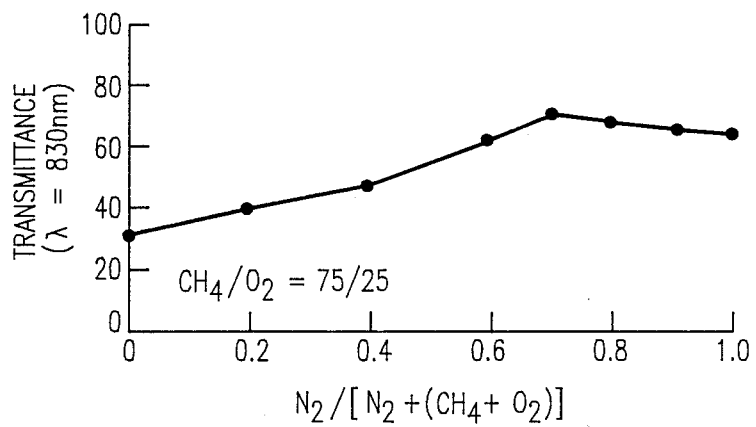

Next, the thus manufactured optical disc comprising the ICON film as the transparent adhesive layer was evaluated in terms of transmittance by the use of a laser beam in the same manner as in embodiment 1. The results of this evaluation are shown in FIG. 3(b). The ICON film formed by the use of the mixed gases of such compositions that $CH_4/O_2=25/75$ and $N_2/(CH_4+O_2+N_2)=0.2$ to 0.4 showed no peel-off. The ICON film formed by the use of mixed gases of such compositions that $CH_4/O_2=75/25$ constant and $N_2/(CH_4+O_2+N_2)=0$ to 100 showed insufficient transparency as shown in FIG. 3(c).

(Embodiment 3)

An optical disc was manufactured comprising an ICON film transparent adhesive layer formed in the same manner as in embodiments 1 and 2 except that compositions of mixed gases were varied. The compositions of mixed gases were determined such that the mixing ratios of $CH_4/O_2$ were held constant such as 25/75, 50/50 and 75/25, and the mixing ratios of $N_2/(CH_4+O_2+N_2)$ were varied between 0 to 100. The total gas flow quantity of the entire sputtering was adjusted to 60 SCCM at a maximum, and the electric discharge times were so arranged as to obtain a film of 1000 Å in thickness.

Figure 4A:
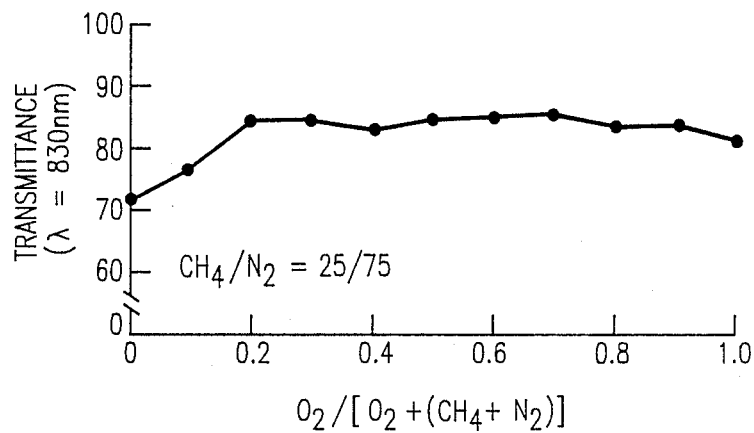
Figure 4B:
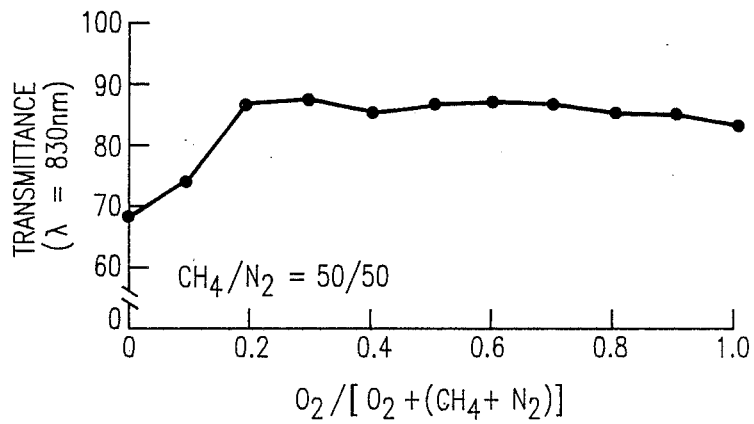
Figure 4C:
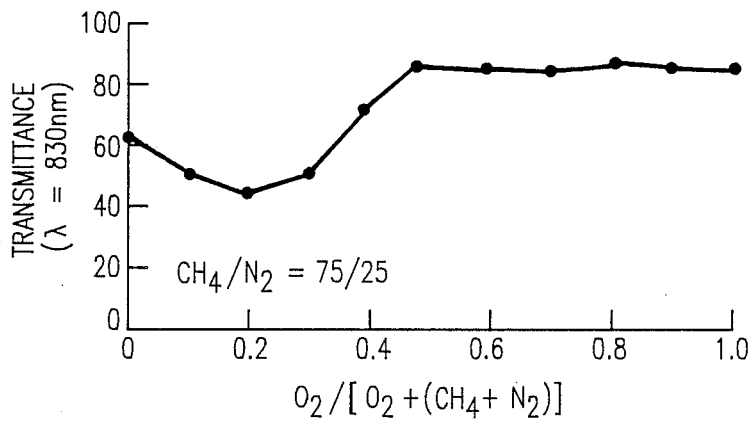

Next, the thus manufactured ICON film and optical disc comprising ICON film as the adhesive layer were evaluated in terms of transmittance by the use of a laser beam, and the results thereof are shown in FIGS. 4(a) through FIG. 4(c). The compositions of mixed gases used in forming the ICON film that showed no peel-off were such that when $CH_4/N_2 = 25/75$, $(CH_4+N_2)O_2=90/10$ to 40/60, and when $CH_4/N_2=50//50$, $(CH_4+N_2)/O_2=90/10$ to 40/60, and when $CH_4/N_2=50/50$, $(CH_4+N_2)/O_2=80/20$ to 40/60, further when $CH_4/N_2=75/25$, $(CH_4+N_2)/O_2=55/45$ to 40/60.

(Embodiment 4)

An optical disc was manufactured comprising an ICON film adhesive layer formed in the same manner as in embodiments 1 through 3 except that the compositions of mixed gases were varied. The compositions of mixed gases were determined such that the mixing ratios of $N_2/O_2$ were held constant such as 25/75, 50/50 and 75/25, and the mixing ratios were varied between 100/0 to 0/100. The total gas flow quantity of the entire sputtering was adjusted to 60 SCCM and the electric discharge times were so arranged as to obtain a film all of 1000 Å in thickness.

Figure 5A:
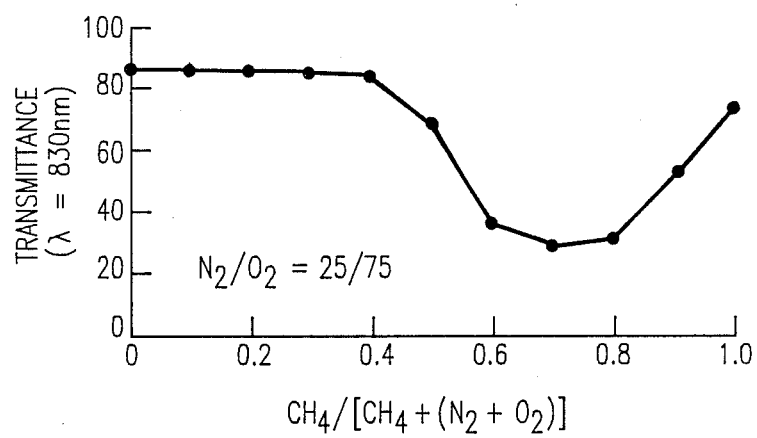
Figure 5B:
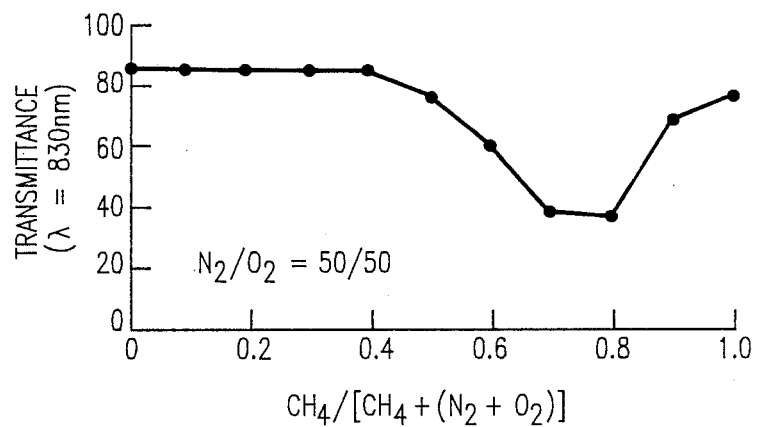
Figure 5C:
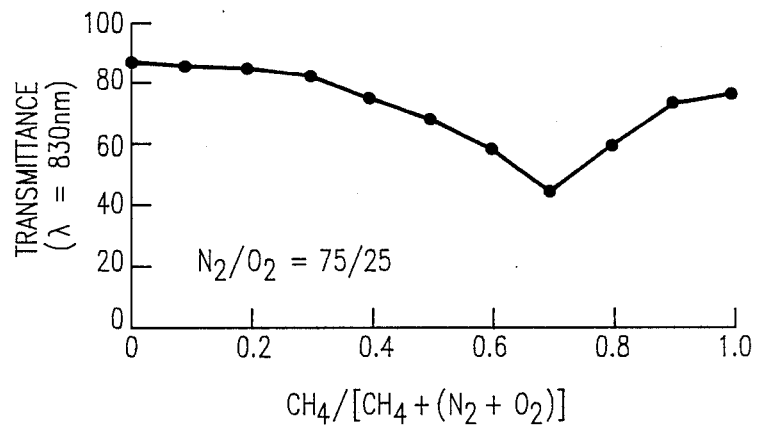

Next, the thus manufactured optical disc comprising the ICON film as the adhesive layer was evaluated in terms of transmittance by the use of a laser beam, and the results thereof are shown in FIGS. 5(a) through 5(c). The compositions of mixed gases used in forming the ICON film that showed no peel-off were such that when $N_2/O_2=25/75$, $(N_2+O_2)/CH_4=60/40$ to 80/20, and when $N_2/O_250/50$, $(N_2=O_2)/CH_4=60/40$ to 90/10.

As can be seen from the descriptions of embodiments through 4, in order to form a transparent adhesive layer 2 consisting of the ICON film that shows no peel-off, the compositions of mixed gases for use in sputtering should meet three conditions shown in the following tables 1 through 3.

TABLE 1

| $CH_4/O_2$ | $(CH_4 + O_2)/N_2$ |
|---|---|
| 50/50 | 80/20–20/80 |
| 25/75 | 80/20–40/60 |
| 75/25 | — |

TABLE 2

| $CH_4/N_2$ | $(CH_4 + N_2)/O_2$ |
|---|---|
| 25/75 | 90/10–40/60 |
| 50/50 | 80/20–40/60 |
| 75/25 | 55/45–40/60 |

TABLE 3

| $N_2/O_2$ | $(N_2 + O_2)/CH_4$ |
| --- | --- |
| 25/75 | 60/40–80/20 |
| 50/50 | 60/40–90/10 |
| 75/25 | 60/40–90/10 |

Figure 6:
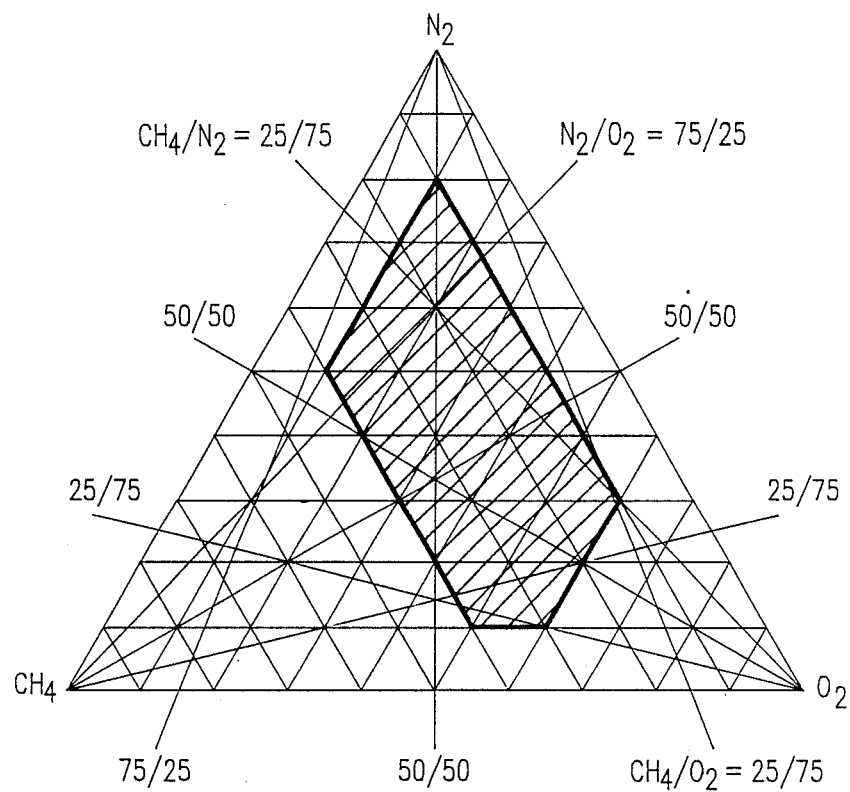
FIG. 6 is a diagram illustrating the preferred ranges of compositions of the mixed gases for use in the above-described sputtering.

The abovementioned three conditions can be illustrated as in FIG. 6.

Namely it was found out that in the case when the ICON film was formed by reactive-sputtering by use of In target within the mixed gases of composition regions such that $CH_4 = 10$ to 40%, $O_2 = 10$ to 60% and $N_2 = 10$ to 80%, respectively in the volume ratios with respect to the total quantity of mixed gases for use in sputtering, the thus formed ICON film possessed sufficient transparencies and preferable adhesive properties with respect to the transparent resin substrate, and was extremely effective as a transparent adhesive layer of an optical disc.

Moreover, in the case when the substrate was polyolefin or polycarbonate, the above-described composition regions were particularly effective.

In embodiments 1 through 4, the transparent adhesive layer was formed by the reactive sputtering. However, it can also be formed by activated evaporation.

Figure 7:
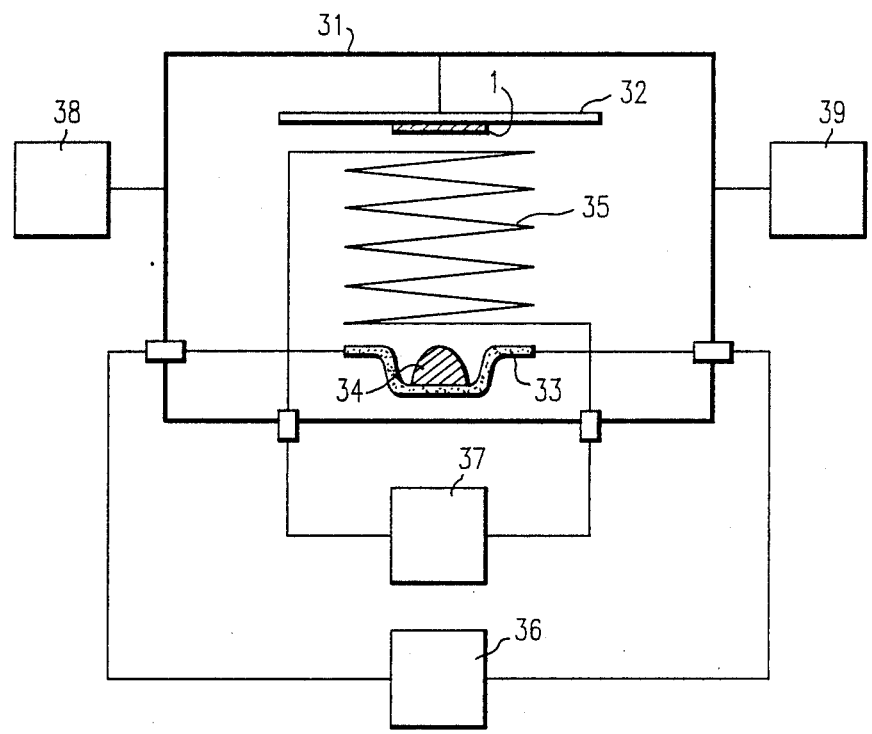
FIG. 7 is a schematic diagram illustrating an activated sputtering apparatus for use in manufacturing the optical disc according to the present invention.

FIG. 7 is a diagram illustrating a schematic configuration of an activated evaporation apparatus. In FIG. 7, on the top within a chamber 31, is disposed a substrate holder 32, and on the lower surface thereof, is supported a transparent resin substrate 1. On the base within the chamber 31, is disposed a boat 33 provided with an electric resistance material opposing the substrate holder 32, and a source 34 is placed on the boat 33. A coil 35 is disposed between the substrate holder 32 and the boat 33. The boat 33 and the coil 35 are respectively connected to a heater power source 36 and an RF power source 37, both disposed outside the sputtering chamber 31. To the sputtering chamber 31, are connected a gas supply system 38 and an exhaust system 39.

(Embodiment 5)

By the use of the activated apparatus shown in FIG. 7, an optical disc with a structure shown in FIG. 1 was manufactured by the following procedures.

First, as the transparent resin substrate 1, a substrate with a guide groove of polymethyl methacrylate of 120 mm in diameter and 1.2 mm thick was prepared. The substrate was cleaned and dried in the same manner as in the embodiment 1, and thereafter was secured by a screw to the substrate holder 32. In this state, the exhaust system 39 was so operated as to exhaust the pressure within the sputtering chamber 31 down to a pressure of $5 \times 10^{-6}$ Torr, thereafter the gas supply system 38 supplied $CH_4$ gas of 10 SCCM, $O_2$ gas of 10 SCCM and $N_2$ gas of 10 SCCM. Next, the RF power source 37 was turned on, and RF power of 200 W was supplied to the coil 35, so that a mixed gas of $CH_4$, $O_2$ and $N_2$ was excited and the plasma state thereof was obtained. Thereafter, the heater power source 36 was turned on and the boat 33 was heated. Then the thus generated heat evaporated an In ball, and formed an ICON film on the substrate 1 as the transparent adhesive layer 2.

Next, by means of the sputtering apparatus shown in FIG. 2, there were deposited in the same manner as in the embodiment 1 on the thus formed transparent adhesive layer 2 such thin film layers one after another as a first transparent protective layer 3 consisting of $Si_3N_4$ film, a recording layer 4 consisting of TbCo film, a second transparent protective layer 5 consisting of $Si_3N_4$ and a light reflecting layer 6 consisting of Al film, so that an optical disc was manufactured. This optical disc was put thorough the accelerated deterioration test the same as in embodiment 1, and after the test there was no peel-off in terms of layer 2 through layer 6, and the shape of guide groove showed no deterioration.

(Embodiment 6)

As the transparent adhesive layer 2, a film containing TeOx and organic materials was formed by the use of the sputtering apparatus shown by FIG. 2 in the following procedures. First, the pressure within the sputtering chamber 11 was exhausted by the exhaust system 20 down to a pressure $5 \times 10^{-6}$ Torr. Thereafter, the gas supply system 19 supplied a mixed gas of $CH_4$ gas of 6 SCCM and $O_2$ gas of 24 SCCM into the sputtering chamber 11, so that the entire gas pressure was maintained at $5 \times 10^{-3}$ Torr.

Next, RF power of 300 W from the sputtering power source 18 was applied to one of the sputtering sources 15 in which a Te target was disposed, so that the pre-sputtering was performed for 5 minutes. Thereafter, one of the shutters 16 provided over the above-described one of the sputtering sources 15 was opened, and a sputtering was performed for 10 minutes, so that a film, as the transparent adhesive layer 2, was formed on the substrate 1 supported by the substrate holder 12. Then the substrate 1 was taken out. This process formed the transparent adhesive layer 2 of 1000 Å thick containing hydrocarbon (chain hydrocarbon) and tellurium oxide.

In order to form the transparent adhesive layer 2 provided with high transparency and superior adhesive properties with respect to the transparent resin substrate 1 and also to the first transparent protective layer 3, the mixed gases for sputtering are desirable to be such that the mixing ratios of $O_2$ are more than or equal to 70% in volume ratio with respect to the total quantity of the mixed gases for sputtering.

Next, the substrate 1 on which this transparent adhesive layer 2 was formed was disposed within the four-target magnetron sputtering apparatus, and an SiN film of 500 Å thick as the first transparent protective layer 3 was formed on the transparent adhesive layer 2. Next, a sputter-etching was performed, so that the surface of the first transparent protective layer 3 was cleaned, on which was formed a TbCo film of 250 Å as the recording layer 4. Further, there were formed one after another such thin films as a SiN film of 1000 Å thick as the second transparent protective layer 5, and an Al film of 500 Å thick as the light reflecting layer 6, so that the optical disc of such construction as shown in FIG. 1 was obtained.

The thus obtained optical disc was disposed within a magneto-optic record/reproduction apparatus, and recording bits were formed under such conditions that a disc rotation speed = 1200 r.p.m., recording frequency = 1.11 MHz (pulse width = 450 n sec), recording power = 5 mW and recording magnetic field = 500 Oe. Thereafter, the reproduction C/N (carrier to noise ratio) and the jitter width were measured by the use of a spectrum analyzer and a jitter counter. The results of this measurement, reproduction C/N = 52 dB, the second harmonics $\leq 15$ dB and the jitter width $\leq 10$ n sec, were sufficiently applicable to practical use as a disc storage device.

Next, the optical disc on which the recording bits were formed was put through the accelerated deterioration test under environments that change cyclically between 65° C - 95% R. H. of 3 hours and 25° C. - 95% R. H. of 2 hours for period of 10 cycles. Thereafter, again the reproduction C/N and jitter width were measured. However, there was no significant difference between the values measured before and after the abovementioned accelerated deterioration test. Further, the surface state of the optical disc also produced no significant difference in comparison before and after the accelerated deterioration test. With the microscopic inspection, no abnormality was recognized except that there were dotted particles of dust.

On the other hand, as a comparison sample I, an optical disc without the transparent adhesive layer 2 was manufactured by the same process described above (except that thickness of the first transparent protective layer 3 was 1500 Å), and the abovementioned evaluation tests were performed. Before the accelerated deterioration test, the comparison sample I showed a reproduction C/N and jitter width of the same values as those of the optical disc according to the present invention. However, after the accelerated deterioration test, the first transparent protective layer 3 peeled off the substrate 1, and the noise level of the comparison sample I was conspicuously raised. and the reproduction C/N became impossible to be measured.

Moreover, as a comparison sample II, an optical disc without the first transparent protective layer 3 shown in FIG. 1 was manufactured using the same process described above (except that the thickness of the transparent adhesive layer 2 was to 1500 Å and the sputter-etching process was performed prior to formation of the recording layer 4), and the abovementioned evaluation tests were performed. Before the accelerated deterioration test, the reproduction C/N of the comparison sample II was as low as of 45 dB, and after the accelerated deterioration test, the film showed no peeloff. However, the reproduction became impossible. Furthermore, before and after the accelerated deterioration test, Kerr hysteresIs characteristics under room temperatures of the comparison sample II were statically measured by application of a He-Ne laser beam from the substrate side thereof. The measurements confirmed the fact that even before the accelerated deterioration test, the comparison sample II had a vertically magnetized film whose Kerr hysteresis loop was not in a good square shape. After the test, the film changed for the worse into a plane magnetized film. The transparent adhesive layer containing TeOx and hydrocarbon maintains uncoupled resolved oxygen which cannot be removed even after the process of sputter-etching. Thus a portion of the recording layer 4 is caused to oxidize, and its oxidation reaches advanced stage under the accelerated deterioration test. As can be seen from the evaluation results of the comparison sample II, it is desirable to form the transparency adhesive layer 2 such that on the transparent resin substrate 1 as shown in FIG. 1, the first transparent protective layer 3 is sandwiched between the transparent adhesive layer 2 and the recording layer 4.

In addition, as a comparison sample III, an optical disc with an adhesive layer consisting of only hydrocarbon was manufactured in the same structure as in FIG. 1. The formation of the adhesive layer consisting of only hydrocarbon was performed by a plasma polymerization using $C_2H_4$ gas. Next, this optical disc, as the comparison sample III, was evaluated in the same manner as in embodiment 6 in terms of reproduction C/N immediately after the manufacture, and there was obtained a value of 46 dB, which was lower than the value of the optical disc in embodiment 6. This is because the transparency of the adhesive layer consisting of only hydrocarbon is insufficient, and the light reflection factor R of the optical disc is low.

Moreover, the optical disc of the comparison sample III was put through the cyclic accelerated deterioration test, and the peel-off phenomena occurred and a reproduction C/N became impossible to measure. The "peel-off" portion was peeled by the use of adhesive tapes and it was confirmed that the dark brown adhesive layer consisting of only C-H remained on the transparent resin substrate. Thus the peel-off occurred between the adhesive layer and the first transparent protective layer.

From these results, it was found that in order to obtain an adhesive layer with sufficient transparency and superior adhesive properties with respect to the transparent protective layer, the adhesive layer should include not only organic compounds but also transparent metallic compounds.

This invention is not limited to the above-described embodiments, but various modifications thereof can be put into practice as follows. For example, in the previous embodiments, TbCo film was used as the recording layer However, besides this, RE-TM films of all kinds such as GdCo films, TbFe films and TbCoFe films can also be used. Moreover, besides RE-TM films, there can be obtained various other kinds of such films that are effective for all the recording layers which are inferior in adhesive properties with respect to the resin substrate. Such films are for example, metallic group recording layers such as chalcogen films that center about Te and Se, semiconductor-like films and low-grade oxide films that are made up primarily of InSb, and hue change films such as Ag-Zn films and Al-Cu films that utilize changes of crystallized structures. particularly, in the case of recording layers of metallic groups such as RE-TM films that are inferior per se in humidity resistance, the abovementioned effectiveness can be significantly enhanced.

Further, in the above-described embodiments, there were cited $In_2O_3$, InN and TeOx as transparent metallic compounds included in the transparent adhesive layer. However, as described above, as transparent metallic compounds to be included in the transparent adhesive layer, there can be utilized at least one kind of substances such as oxides of In, Te, Al, Si, Ti, Cr, Ge and Sn, nitrides of In, Al, Si, Ge and B, fluorides of Mg and Ca, and sulfides of Zn. By reactive sputtering or activated sputtering, a mixed gas including $O_2$ may be used to form a transparent adhesive layer that includes oxides of In, Te, Al, Si, Ti, Cr, Ge and Sn, a mixed gas including $N_2$ may be used to form a transparent adhesive layer that includes nitrides of In, Al, Si, Ge and B, and a mixed gas including $H_2S$ may be used to form a transparent adhesive layer that includes sulfides of Zn, respectively. In addition, to form fluorides of Mg and Ca, a sputtering source consisting of $MgF_2$ and $CaF_2$ may be used.

Moreover, it is not necessary for the transparent adhesive layer according to the present invention to possess such compositions that are uniform in the direction of film thickness. For example, there may be possessed compositions such that the content ratios of organic compounds are relatively larger on the side close to the transparent resin substrate, while the content ratios of metallic compounds are relatively larger on the side close to the transparent protective layer. When the transparent adhesive layer is formed in the above-described manner, the adhesive properties thereof with respect to the transparent resin substrate and also to the transparent protective layer can be more effectively enhanced. The transparent adhesive layer for compositions that are non-uniform in the direction of film thickness can be obtained by continuously varying compositions of mixed gases being supplied for sputtering in the process of film formation.

As described above, according to the present invention, there can be provided a highly reliable optical recording medium having a transparent adhesive layer which contains organic compounds, such as hydrocarbon or the like that constitutes resin materials and metallic compounds, in which thermal expansion coefficients are nearly equal to those of inorganic transparent materials that constitute a transparent protective layer, whereby peel-off phenomena to be caused by secular variation can be avoided. Furthermore, according to the present invention, the transparent protective layer can prevent the recording layer from oxidizing, so that even when the recording layer is constituted by metallic materials which are inferior in oxidation-resistance, the life of the medium can be significantly prolonged.

Moreover, according to the present invention, the abovedescribed transparent adhesive layer can be formed by reactive sputtering or by activated sputtering by the use of metallic targets or metallic sputtering sources within mixed gases containing gases that react with such metallic materials and organic compound gases. Thereby an optical recording medium superior in peel-off resistance can be mass-produced with high efficiency.

Obviously, numerous additional modifications and variations of the present invention are possible in light of the above teachings. It is therefore to be understood that within the scope of the appended claims, the invention may be practiced otherwise than as specifically described herein.

What is claimed:

1. An optical recording medium, comprising:
    a transparent resin substrate;
    a transparent protective layer;
    transparent adhesive layer means between the resin substrate and the protective layer, including a combination of inorganic and hydrocarbon compounds for bonding the protective layer to the resin substrate and for substantially preventing moisture from penetrating between the protective layer and the substrate; and
    optical recording layer on the transparent protective layer.

2. The optical recording medium of claim 1 wherein the transparent adhesive layer means includes an adhesive layer having a substrate side and a protective side, the concentration of organic compounds on the substrate side being higher than the concentration of metallic compounds, and the concentration of metallic compounds on the protective side being higher than the concentration of organic compounds.

3. An optical recording layer according to claim 1, wherein said recording layer includes a rare earth-transition metallic amorphous ferrimagnetic alloy thin film.

4. An optical recording medium according to claim 1, wherein said inorganic compound includes an indium compound.

5. An optical recording medium according to claim 4, wherein said indium compound includes a mixture of indium oxide and indium nitride.

* * * * *